United States Patent
Qian

(10) Patent No.: US 11,669,219 B2
(45) Date of Patent: *Jun. 6, 2023

(54) LAUNCHING APPLICATION TASK BASED ON SINGLE USER INPUT AND PRESET CONDITION

(71) Applicant: Huawei Technologies Co., Ltd., Shenzhen (CN)

(72) Inventor: Kai Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 62 days.

This patent is subject to a terminal disclaimer.

(21) Appl. No.: 17/491,868

(22) Filed: Oct. 1, 2021

(65) Prior Publication Data

US 2022/0100353 A1   Mar. 31, 2022

Related U.S. Application Data

(63) Continuation of application No. 15/154,377, filed on May 13, 2016, now Pat. No. 11,144,172, which is a
(Continued)

(30) Foreign Application Priority Data

Nov. 13, 2013 (CN) .......................... 201310566156.1

(51) Int. Cl.
*G06F 3/04817* (2022.01)
*G06F 3/04883* (2022.01)
(Continued)

(52) U.S. Cl.
CPC ........ *G06F 3/04817* (2013.01); *G06F 3/0482* (2013.01); *G06F 3/0484* (2013.01); *G06F 3/04883* (2013.01); *G06F 9/4451* (2013.01)

(58) Field of Classification Search
CPC .. G06F 3/04817; G06F 3/0482; G06F 3/0484; G06F 3/04883; G06F 9/4451
See application file for complete search history.

(56) References Cited

U.S. PATENT DOCUMENTS 5,923,413 A    7/1999  Laskowski
8,411,041 B2   4/2013  Lee et al.
(Continued)

FOREIGN PATENT DOCUMENTS

CN    102063261 A    5/2011
CN    102236421 A    11/2011
(Continued)

OTHER PUBLICATIONS

"How do you use one? How do you choose one? Tablet and Smart Phones Part 4 How to fully solve "I don't get it"!," ASCI PC, vol. 16, No. 7, Mar. 23, 2013, 13 pages.

*Primary Examiner* — Jennifer N Welch
*Assistant Examiner* — Amy P Hoang
(74) *Attorney, Agent, or Firm* — Conley Rose, P.C.

(57) ABSTRACT

An application program control method includes acquiring user operation information, determining, according to the user operation information, an application program icon operated by a user, determining a target control operation according to a control operation of an application program corresponding to the application program icon, and executing the target control operation.

16 Claims, 12 Drawing Sheets

Related U.S. Application Data continuation of application No. PCT/CN2014/088786, filed on Oct. 17, 2014.

(51) Int. Cl.
*G06F 9/445* (2018.01)
*G06F 3/0482* (2013.01)
*G06F 3/0484* (2022.01)

(56) References Cited

U.S. PATENT DOCUMENTS

| | | |
|---|---|---|
| 8,539,376 B2 | 9/2013 | Utsuki et al. |
| 9,798,443 B1 | 10/2017 | Gray |
| 2004/0075675 A1 | 4/2004 | Raivisto et al. |
| 2004/0261031 A1 | 12/2004 | Tuomainen et al. |
| 2005/0120306 A1 | 6/2005 | Klassen et al. |
| 2005/0278647 A1 | 12/2005 | Leavitt et al. |
| 2006/0069604 A1 | 3/2006 | Leukart et al. |
| 2006/0218502 A1 | 9/2006 | Matthews et al. |
| 2006/0288107 A1 | 12/2006 | Klassen et al. |
| 2008/0074399 A1 | 3/2008 | Lee et al. |
| 2008/0212192 A1 | 9/2008 | Steenblik et al. |
| 2008/0282142 A1 | 11/2008 | Butlin et al. |
| 2008/0295017 A1 | 11/2008 | Tseng et al. |
| 2009/0037413 A1 | 2/2009 | Castell et al. |
| 2010/0073160 A1 | 3/2010 | Gilmour et al. |
| 2010/0153868 A1 | 6/2010 | Allen et al. |
| 2011/0016390 A1 | 1/2011 | Oh et al. |
| 2011/0055763 A1 | 3/2011 | Utsuki et al. |
| 2011/0167380 A1 | 7/2011 | Stallings et al. |
| 2011/0202879 A1 | 8/2011 | Stovicek et al. |
| 2011/0265035 A1 | 10/2011 | Lepage et al. |
| 2011/0319138 A1 | 12/2011 | Noh |
| 2012/0054682 A1 | 3/2012 | Bell et al. |
| 2012/0094719 A1 | 4/2012 | Choi et al. |
| 2012/0113036 A1 | 5/2012 | Lee et al. |
| 2012/0144299 A1 | 6/2012 | Patel et al. |
| 2012/0150970 A1 | 6/2012 | Paterson et al. |
| 2012/0179978 A1 | 7/2012 | Klassen et al. |
| 2012/0297041 A1 | 11/2012 | Momchilov |
| 2013/0019172 A1 | 1/2013 | Kotler et al. |
| 2013/0019173 A1 | 1/2013 | Kotler et al. |
| 2013/0019174 A1 | 1/2013 | Gil et al. |
| 2013/0019182 A1 | 1/2013 | Gil et al. |
| 2013/0019205 A1 | 1/2013 | Gil et al. |
| 2013/0019206 A1 | 1/2013 | Kotler et al. |
| 2013/0205283 A1 | 8/2013 | Warren |
| 2015/0261336 A1 | 9/2015 | Lee et al. |
| 2015/0331711 A1 | 11/2015 | Huang et al. |
| 2016/0139677 A1 | 5/2016 | Nagata et al. |
| 2016/0170608 A1* | 6/2016 | Zambetti ............... G06F 3/0236 715/810 |
| 2016/0209993 A1 | 7/2016 | Singal et al. |
| 2016/0231876 A1 | 8/2016 | Wang |
| 2018/0048756 A1 | 2/2018 | Tseng |

FOREIGN PATENT DOCUMENTS

| | | |
|---|---|---|
| CN | 102243889 A | 11/2011 |
| CN | 102404456 A | 4/2012 |
| CN | 102736856 A | 10/2012 |
| CN | 103092464 A | 5/2013 |
| CN | 103092471 A | 5/2013 |
| CN | 103176595 A | 6/2013 |
| CN | 103279295 A | 9/2013 |
| CN | 103616992 A | 3/2014 |
| EP | 2290925 A1 | 3/2011 |
| EP | 2339443 A1 | 6/2011 |
| JP | 2000330679 A | 11/2000 |
| JP | 2006163988 A | 6/2006 |
| JP | 2007512635 A | 5/2007 |
| JP | 2007265026 A | 10/2007 |
| JP | 2011053790 A | 3/2011 |
| JP | 2012118950 A | 6/2012 |
| JP | 2012146068 A | 8/2012 |
| JP | 2013156692 A | 8/2013 |
| JP | 2015026318 A | 2/2015 |
| KR | 20030086123 A | 11/2003 |
| KR | 20100037945 A | 4/2010 |
| KR | 20120001476 A | 1/2012 |
| RU | 2253150 C2 | 5/2005 |
| RU | 2383919 C2 | 3/2010 |
| RU | 2478998 C9 | 8/2013 |
| WO | 2012146900 A1 | 11/2012 |
| WO | 2013040284 A1 | 3/2013 |

* cited by examiner

LAUNCHING APPLICATION TASK BASED ON SINGLE USER INPUT AND PRESET CONDITION

CROSS-REFERENCE TO RELATED APPLICATIONS

This is a continuation of U.S. patent application Ser. No. 15/154,377 filed on May 13, 2016, now U.S. Pat. No. 11,144,172, which is a continuation of International Patent Application No. PCT/CN2014/088786 filed on Oct. 17, 2014, which claims priority to Chinese Patent Application No. 201310566156.1 filed on Nov. 13, 2013. All of the aforementioned patent applications are hereby incorporated by reference in their entireties.

TECHNICAL FIELD

The present disclosure relates to the communications field, and in particular, to an application program control method and a related apparatus.

BACKGROUND

With the development of communications technologies and electronic technologies, an electronic device, especially a mobile electronic device, has increasingly more functions, and a control operation on an application program in the electronic device becomes a topic receiving attention.

In the prior art, an application program is generally presented on a display interface of an electronic device in a form of an application program icon in order to be perceived by a user. By operating the application program icon, the user starts a corresponding application program, and presents an application interface of the application program. Further, a control operation, for example, viewing information, creating content, and starting a key task, may be executed on the application program using control prompt information of the application interface.

However, in a process of implementing the present disclosure, an inventor finds that the prior art has at least the following problems. A control operation on an application program can be implemented by a user only by starting the application program to open an application interface, searching for and identifying different control services on the application interface, and actively operating the different control services, where the operation is complicated and relatively inefficient.

SUMMARY

The present application provides an application program control method and apparatus in order to resolve a technical problem of a complicated and relatively inefficient control operation in the prior art.

To achieve the foregoing objective, the present application provides the following technical solutions.

According to a first aspect, the present application provides an application program control method, including acquiring user operation information, determining, according to the user operation information, an application program icon operated by a user, determining a target control operation according to a control operation of an application program corresponding to the application program icon, and executing the target control operation.

In a first possible implementation manner of the first aspect, determining a target control operation according to a control operation of an application program corresponding to the application program icon includes determining an execution priority of the control operation of the application program corresponding to the application program icon, and acquiring the target control operation according to the execution priority of the control operation of the application program corresponding to the application program icon, where the target control operation is a control operation with a first execution priority in the control operation.

With reference to the first possible implementation manner of the first aspect, a second possible implementation manner of the first aspect is further provided, where determining an execution priority of the control operation of the application program corresponding to the application program icon includes determining whether the application program corresponding to the application program icon has an unprocessed update task at present, and determining that a control operation, in the control operation of the application program, of processing the unprocessed update task is the control operation with the first execution priority when the application program has an unprocessed update task.

With reference to the second possible implementation manner of the first aspect, a third possible implementation manner of the first aspect is further provided, where when the application program does not have an unprocessed update task, the method further includes determining that a preset control operation that is to be preferentially executed and is in the control operation of the application program is the control operation with the first execution priority.

With reference to the first possible implementation manner of the first aspect, a fourth possible implementation manner of the first aspect is further provided, where determining an execution priority of the control operation of the application program corresponding to the application program icon includes determining that a preset control operation that is to be preferentially executed and is in the control operation of the application program corresponding to the application program icon is the control operation with the first execution priority.

With reference to the third possible implementation manner of the first aspect or the fourth possible implementation manner of the first aspect, a fifth possible implementation manner of the first aspect is further provided, where when the preset control operation that is to be preferentially executed does not exist in the control operation of the application program, the method further includes outputting prompt information about control operation setting, and processing, according to a processing request of the user, a control operation determined by the user as the preset control operation that is to be preferentially executed.

In a sixth possible implementation manner of the first aspect, determining a target control operation according to a control operation of an application program corresponding to the application program icon includes determining an execution priority of each of the control operation of the application program corresponding to the application program icon, acquiring a control operation executed by the application program within a preset time prior to a present moment, and selecting a control operation with a highest execution priority from a control operation excluding the executed control operation as the target control operation.

According to a second aspect, the present application provides an application program control apparatus, including an information acquiring module configured to acquire user operation information, an icon determining module configured to determine, according to the user operation information acquired by the information acquiring module, an application program icon operated by a user, and an operation determining module configured to determine a target control operation according to a control operation of an application program corresponding to the application program icon that is determined by the icon determining module.

In a first possible implementation manner of the second aspect, the operation determining module includes a first determining module configured to determine an execution priority of the control operation of the application program corresponding to the application program icon that is determined by the icon determining module, and a second determining module configured to acquire the target control operation according to the execution priority that is determined by the first determining module and of the control operation of the application program corresponding to the application program icon, where the target control operation is a control operation with a first execution priority in the control operation.

With reference to the first possible implementation manner of the second aspect, a second possible implementation manner of the second aspect is further provided, where the first determining module includes a task judging module configured to determine whether the application program corresponding to the application program icon that is determined by the icon determining module has an unprocessed update task at present, and a first determining submodule configured to determine that a control operation, in the control operation of the application program, of processing the unprocessed update task is the control operation with the first execution priority when the task judging module determines that the application program has an unprocessed update task.

With reference to the second possible implementation manner of the second aspect, a third possible implementation manner of the second aspect is further provided, where the first determining module further includes a second determining submodule configured to determine that a preset control operation that is to be preferentially executed and is in the control operation of the application program is the control operation with the first execution priority when the task judging module determines that the application program does not have an unprocessed update task.

With reference to the third possible implementation manner of the second aspect, a fourth possible implementation manner of the second aspect is further provided, where the first determining module further includes an information output module configured to output prompt information about control operation setting when the preset control operation that is to be preferentially executed does not exist in the control operation of the application program, and a setting module configured to process, according to a processing request of the user, a control operation determined by the user as the preset control operation that is to be preferentially executed.

With reference to the first possible implementation manner of the second aspect, a fifth possible implementation manner of the second aspect is further provided, where the first determining module is further configured to determine that a preset control operation that is to be preferentially executed and is in the control operation of the application program corresponding to the application program icon that is determined by the icon determining module is the control operation with the first execution priority.

With reference to the fifth possible implementation manner of the second aspect, a sixth possible implementation manner of the second aspect is further provided, where the apparatus further includes an information output module configured to output prompt information about control operation setting when the preset control operation that is to be preferentially executed does not exist in the control operation of the application program, and a setting module configured to process, according to a processing request of the user, a control operation determined by the user as the preset control operation that is to be preferentially executed.

In a seventh possible implementation manner of the second aspect, the operation determining module includes a priority determining module configured to determine an execution priority of each of the control operation of the application program corresponding to the application program icon, an acquiring module configured to acquire a control operation executed by the application program within a preset time prior to a present moment, and an operation determining submodule configured to select a control operation with a highest execution priority from a control operation excluding the executed control operation as the target control operation.

According to a third aspect, the present application provides an electronic device, including at least a receiver and a processor, where the receiver is configured to acquire user operation information, and the processor is configured to determine, according to the user operation information acquired by the receiver, an application program icon operated by a user, determine a target control operation according to a control operation of an application program corresponding to the application program icon, and execute the target control operation.

In a first possible implementation manner of the third aspect, that the processor determines the target control operation according to the control operation of the application program corresponding to the application program icon further includes determining an execution priority of the control operation of the application program corresponding to the application program icon, and acquiring the target control operation according to the execution priority of the control operation of the application program corresponding to the application program icon, where the target control operation is a control operation with a first execution priority in the control operation.

In conclusion, the present application provides an application program control method and apparatus, where an application program icon operated by a user may be determined by acquiring user operation information, and a target control operation of an application program corresponding to the application program icon may be further determined such that the target control operation may be executed on the application program. The control operation is simple and efficient, compared with complicated steps in the prior art in which the user needs to first start the application program to open an application interface and then actively select and trigger a control operation on the application program, such as triggering a control operation on the application program. In addition, the user has no cognitive load, and when the user operates an application program icon, a target control operation of a corresponding application program may be automatically determined, thereby implementing efficient and quick control.

BRIEF DESCRIPTION OF DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from the provided accompanying drawings without creative efforts.

DESCRIPTION OF EMBODIMENTS

The following clearly and completely describes the technical solutions in the embodiments of this application with reference to the accompanying drawings in the embodiments of the present application. The described embodiments are only a part rather than all of the embodiments of this application. All other embodiments obtained by a person of ordinary skill in the art based on the embodiments of the present application without creative efforts shall fall within the protection scope of this application.

One of main ideas of the embodiments of the present application includes the following.

An application program icon operated by a user may be determined when user operation information is acquired, and a target control operation of an application program corresponding to the application program icon may be further determined such that the target control operation may be executed on the application program. The control operation is simple and efficient, and the user has no cognitive load, and when the user operates an application program icon, a target control operation of a corresponding application program may be intelligently determined, thereby implementing efficient and quick control.

Figure 1:
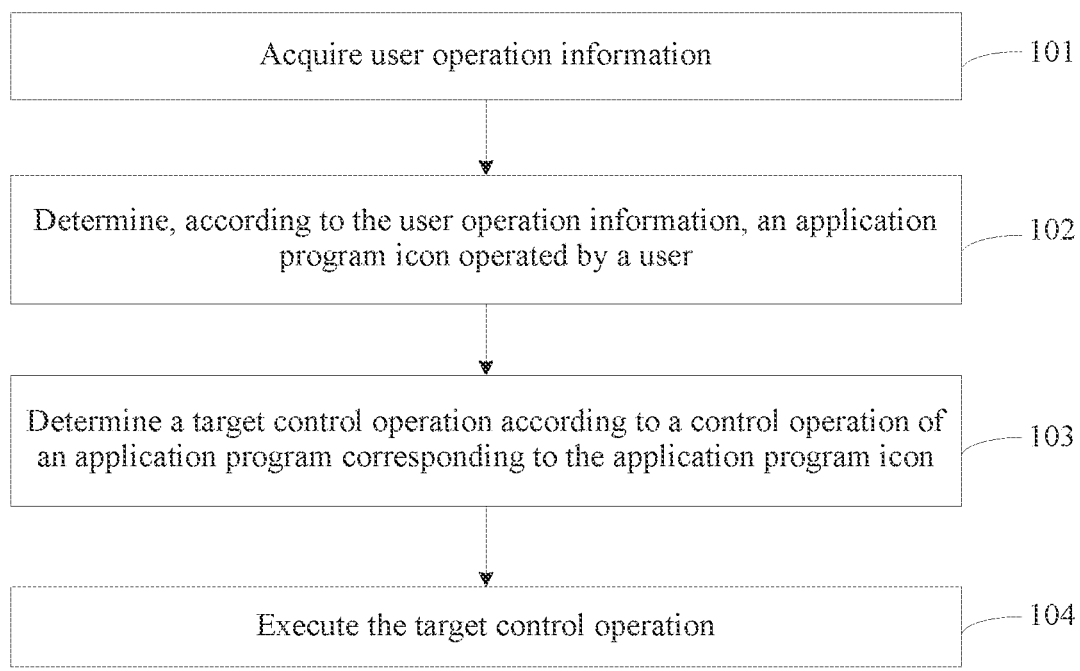
FIG. 1 is a flowchart of an embodiment of an application program control method according to an embodiment of the present application.

FIG. 1 is a flowchart of an embodiment of an application program control method according to an embodiment of the present application, and the method may include the following steps.

Step 101: Acquire user operation information.

The user operation information may refer to keyboard operation information, touchscreen operation information, and the like.

The keyboard operation information may be operation information generated when a user operates a keyboard of an electronic device, for example, triggers a specific key or key combination of the keyboard in order to implement an operation on an application program icon displayed on an application program icon presentation interface of the electronic device.

The touchscreen operation information may refer to operation information generated according to a specific touch or approaching operation executed at a position at which an application program icon is located on an application program icon presentation interface of a touchscreen of the electronic device, where the specific touch or approaching operation may be, for example, a click operation, a sliding operation, or a user-defined gesture operation.

Certainly, the user operation information in this embodiment of the present application includes but is not limited to the foregoing information.

Step 102: Determine, according to the user operation information, an application program icon operated by a user.

The user operation information is generated by operating the application program icon. Therefore, the application program icon operated by the user may be determined by identifying the user operation information.

On the application program icon presentation interface of the electronic device, application program icons of different types of application programs are arranged on a screen according to a specific order, for example, according to an alphabetical order of initials or according to an order of installation time of the application programs. According to a requirement, the user may select a corresponding application program icon to execute a corresponding operation, and accordingly user operation information is generated.

The application program icon is an icon used to reference an application program, and each application program icon is corresponding to an application program.

Step 103: Determine a target control operation according to a control operation of an application program corresponding to the application program icon.

Each application program generally includes multiple types of control operations, for example, viewing information, creating information, and starting a key task. Using a mobile phone as an example, an application program icon displayed on an application program icon presentation interface of the mobile phone includes a "Message" icon, where the "Message" icon is corresponding to a short message service (SMS) application program, and the SMS application program may include control operations such as sending an SMS message, creating an SMS message, and viewing an unread SMS message. For another example, a "Dial" icon is further included, and the "Dial" icon is corresponding to a dialing program, where the dialing program may include control operations such as viewing a missed call, making a call, and answering a call.

In this embodiment of the present application, the application program icon operated by the user is determined according to the user operation information, and the target control operation may be further determined from multiple control operations of the application program corresponding to the application program icon.

The target control operation may be a control operation that the user expects to execute on the application program corresponding to the application program icon, or a control operation that needs to be executed at present on the application program corresponding to the application program icon, or the like.

Determining the target control operation may be implemented in multiple manners.

In a possible implementation manner, an execution priority of the control operation of the application program corresponding to the application program icon may be first determined.

The target control operation is determined according to an execution priority of the control operation of the application program corresponding to the application program icon, where the target control operation is a control operation with a first execution priority in the control operation.

When each control operation of the application program has an execution priority, the first execution priority is a highest execution priority.

Certainly, in control operations of the application program, there may be only one control operation that has the execution priority, which is the first execution priority.

Determining the target control operation may also be implemented in another manner, which is described in detail in the following embodiment.

Step 104: Execute the target control operation.

Still using the mobile phone as an example, for the SMS application program corresponding to the "Message" icon, when a target control operation of the SMS application program is creating an SMS message, a control operation of creating the SMS message of the SMS application program may be implemented by executing the target control operation such that an interface of creating the SMS message may be presented on a display interface.

For another example, for an audio playing application program corresponding to a "Music" icon, a target control operation of the audio playing application program is playing a current music file, and then an operation of playing music of the audio playing application program may be directly implemented by means of the target control operation.

In this embodiment, an application program icon operated by a user may be determined when user operation information is acquired, and a target control operation of an application program corresponding to the application program icon may be further determined such that the target control operation may be executed. The control operation is simple and efficient, compared with the prior art in which the user needs to first start the application program to open an application interface and then actively select and trigger a control operation on the application program. In addition, the user has no cognitive load, and when the user operates an application program icon, a target control operation of a corresponding application program may be automatically determined, thereby implementing efficient and quick control.

Figure 2A:
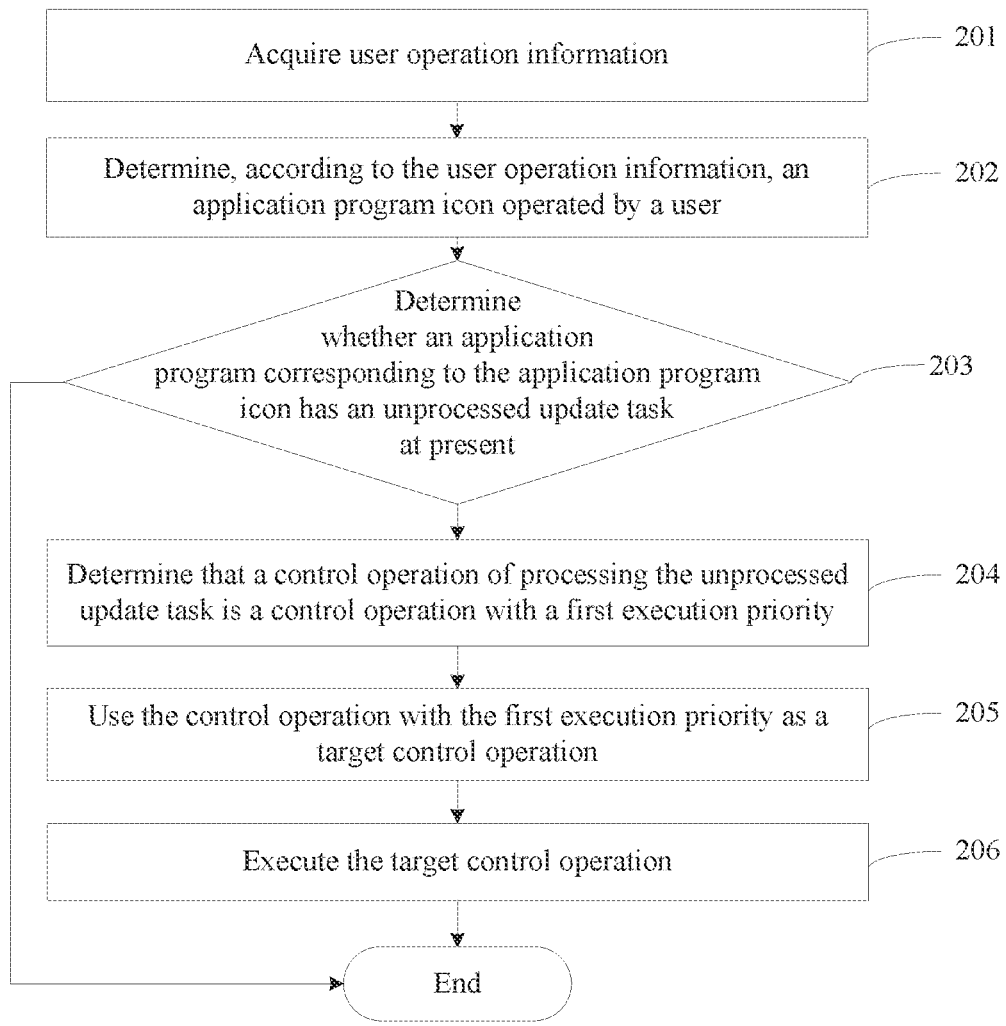
FIG. 2A is a flowchart of another embodiment of an application program control method according to an embodiment of the present application.

FIG. 2A is a flowchart of another embodiment of an application program control method according to an embodiment of the present application, and the method may include the following steps.

Step 201: Acquire user operation information.

Step 202: Determine, according to the user operation information, an application program icon operated by a user.

An operation performed by the user on an application program icon displayed on an application program icon presentation interface of an electronic device may be performed in multiple manners, such as click, double-click, and sliding along a first direction or a second direction. In order to be differentiated from an operation in the prior art in which the user operates the application program icon (generally is clicking at a position at which the application program icon is located) to start an application program and present an application interface of the application program, in this embodiment, the user operation information is generated by the user by executing a specific operation on the application program icon.

Therefore, after the user operation information is acquired, as another embodiment, the application program control method may further include determining whether the user operation information satisfies a preset condition; if the user operation information satisfy the preset condition, an operation in step 202 is executed, and if the user operation information does not satisfy the preset condition, an execution procedure of this embodiment may be ended.

The preset condition is used to differentiate different user operation information. For example, when the user executes a double-click operation on an application program icon to trigger application program control of the present application, the preset condition may be that the user operation information is information of two successive clicks within a preset time.

Certainly, determining whether the user operation information satisfies a preset condition may also be determined after the application program icon operated by the user is determined. Accordingly, if the user operation information satisfies the preset condition, a subsequent operation step is further executed, and if the user operation information does not satisfy the preset condition, an instruction of starting the application program to display the application interface of the application program may be executed.

Step 203: Determine whether an application program corresponding to the application program icon has an unprocessed update task at present, if yes, execute step 204, and if no, end a procedure.

Step 204: Determine that a control operation, in the control operation of the application program, of processing the unprocessed update task is a control operation with a first execution priority.

Step 205: Use the control operation with the first execution priority as a target control operation.

In this embodiment, an execution priority of the control operation of the application program corresponding to the application program icon is determined according to whether the application program has an unprocessed update task at present.

The first execution priority may be set only for the control operation of processing the unprocessed update task.

Accordingly, the control operation with the first execution priority may be used as the target control operation according to an execution priority of the control operation of the application program corresponding to the application program icon, that is, the control operation of processing the unprocessed update task is used as the target control operation in order to implement that the unprocessed update task is preferentially processed for the application program.

In a running process of the electronic device, an update task in the application program may be an event generated in a running process of the application program. For example, for an SMS application program, an update task of the SMS application program may be receiving an SMS message, for a dialing application program, an update task of the dialing application program may be receiving incoming call information, and for a calendar application program, an update task of the calendar application program may be occurrence of a new reminded event.

Therefore, a corresponding unprocessed update task is that there is an unread SMS message, incoming call information that has not been viewed, a reminded event that has not been viewed, and the like.

Then, the control operation of processing the unprocessed update task refers to displaying the unread SMS message, displaying the incoming call information, displaying the reminded event, and the like.

Step 206: Execute the target control operation.

In this embodiment, the target control operation is processing the unprocessed update task. Then the update task, or a processing interface of the update task, or the like may be displayed on a display interface of the electronic device when the target control operation is executed.

For example, when the target control operation is displaying the unread SMS message, if the target control operation is executed, the unread SMS message may be displayed on the display interface of the electronic device, thereby facilitating the user in viewing.

As a possible implementation manner of displaying the update task on the display interface of the electronic device, the update task may be displayed on a current application program icon presentation interface, and an update task display area may cover at least a part of application program icons in order to implement quick viewing of the update task.

Figure 2B:
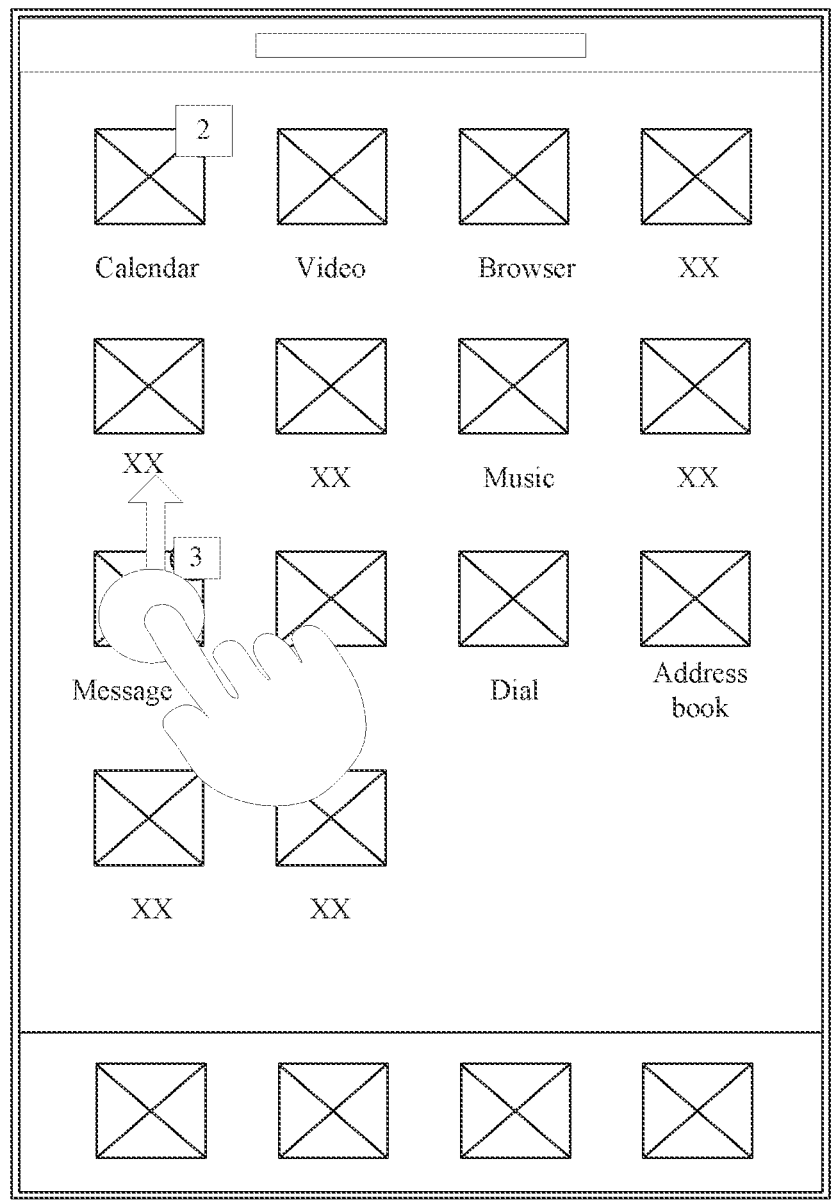
FIG. 2B is a schematic diagram of an interface display of an electronic device applied in an embodiment of the present application.

Using a mobile phone as an example, FIG. 2B shows a schematic display diagram of the display interface of the electronic device in this embodiment of the present disclosure, where the application program icon presentation interface is displayed. Application program icons are generally arranged according to an alphabetical order of application program names or according to an order of installation time of application programs.

As shown in FIG. 2B, the user executes a specific gesture operation on a "Message" application program icon, for example, clicks a "Message" icon and slides in a first direction. Accordingly, a system may acquire the user operation information, and determine that the application program icon operated by the user is the "Message" application program icon.

Figure 2C:
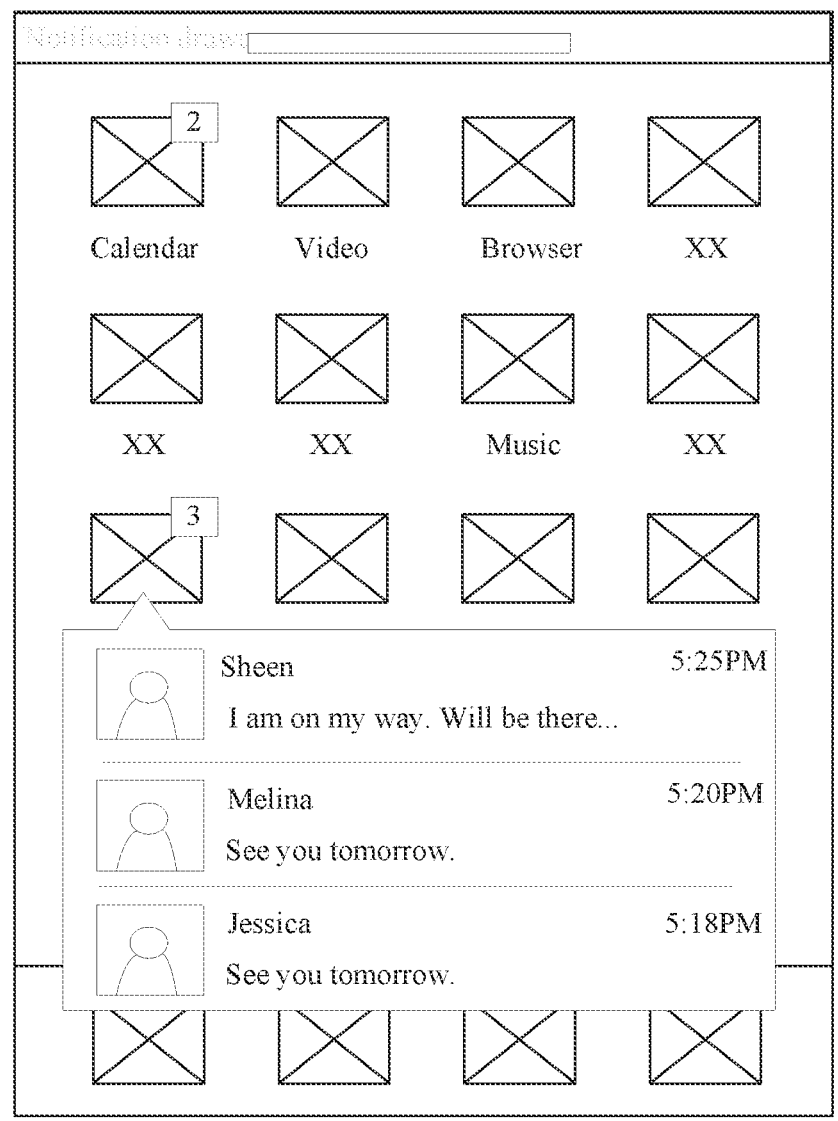
FIG. 2C is a schematic diagram of another interface display of an electronic device applied in an embodiment of the present application.

When an unread SMS message exists in the SMS application program corresponding to the "Message" application program icon, for example, a quantity "3" of unread SMS messages is displayed at a boundary position of the "Message" application program icon in FIG. 2B, viewing the unread SMS messages is the target control operation. Accordingly, the target control operation is executed, and the unread SMS messages are quickly displayed on a current display interface. FIG. 2C shows another schematic display diagram of a display interface of an electronic device according to an embodiment of the present application, where a display area of unread SMS messages covers at least a part of a display area of application program icons.

In this embodiment, user operation information is acquired, and an application program icon operated by a user and an application program corresponding to the application program icon may be determined, and if the application program has an unprocessed update task at present, a control operation of processing the unprocessed update task is used as a target control operation such that a control instruction is generated and executed, thereby implementing the target control operation on the application program. An inventor finds in a study that when the user triggers and starts the application program to display an application interface of the application program, most of preferentially executed operations are processing unprocessed update tasks. Therefore, in this embodiment, by intelligently determining a processing status of an update task of the application program, a control operation of processing the unprocessed update task may be implemented according to information about one user operation of the user. The user has no cognitive load and does not need to perform a complicated operation, and a control process is simple and efficient, and can accurately implement processing on the application program.

Figure 3:
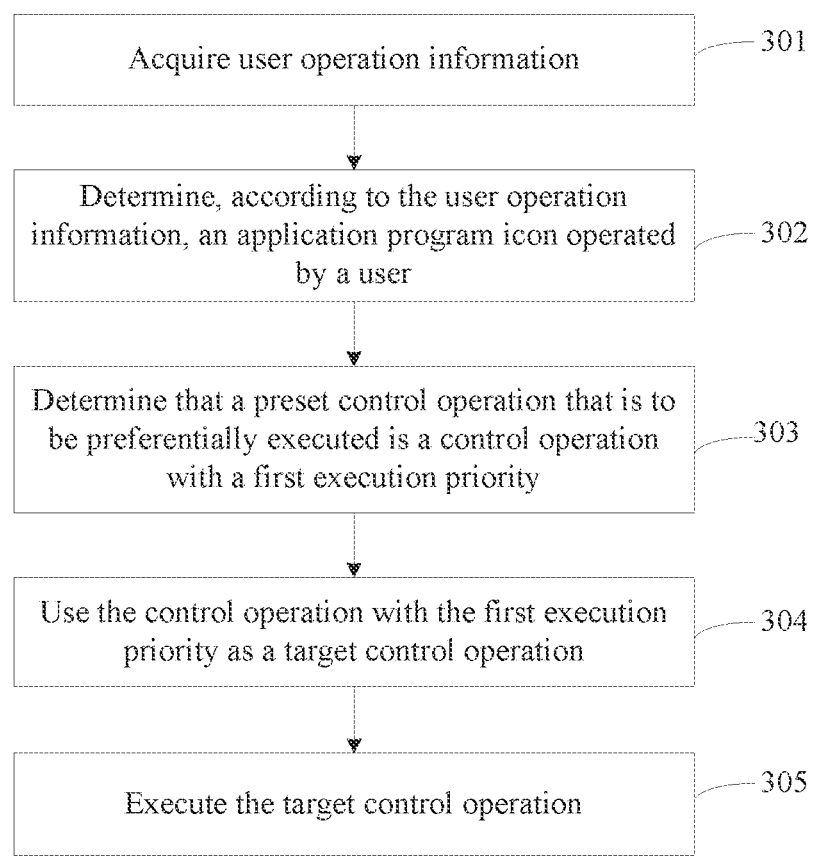
FIG. 3 is a flowchart of still another embodiment of an application program control method according to an embodiment of the present application.

FIG. 3 is a flowchart of another embodiment of an application program control method according to an embodiment of the present application, and the method may include the following steps.

Step 301: Acquire user operation information.

Step 302: Determine, according to the user operation information, an application program icon operated by a user.

As a possible implementation situation, it may further be determined whether the user operation information satisfies a preset condition, and when the preset condition is satisfied, an operation in step 302 or step 303 is further executed.

Step 303: Determine that a preset control operation that is to be preferentially executed and is in a control operation of an application program corresponding to the application program icon is a control operation with a first execution priority.

Step 304: Use the control operation with the first execution priority as a target control operation.

In this embodiment, an execution priority of the control operation of the application program corresponding to the application program icon is determined according to whether the control operation is preset to be preferentially executed. It is determined that the preset control operation that is to be preferentially executed is the control operation with the first execution priority.

Accordingly, it is determined that the control operation with the first execution priority is the target control operation.

Step 305: Execute the target control operation.

For example, for an SMS application program corresponding to a "Message" icon in a mobile phone, the control operation that is to be preferentially executed may be set to creating an SMS message, and then the creating an SMS message is used as the control operation with the first execution priority. Accordingly, when the user operates the "Message" icon, a system may detect the user operation information and further determine the SMS application program, and may determine that the creating an SMS message is the target control operation, and when the target control operation is executed, a creating interface of the SMS message may be output on a display interface.

The control operation that is to be preferentially executed may be obtained by learning according to a historical record. That is, in a historical record of a control operation of the user on any application program, a control operation whose quantity of recording times is greater than a threshold is set as a preset control operation that is to be preferentially executed of the application program such that the preset control operation that is to be preferentially executed conforms to an operation habit of the user.

Certainly, the preset control operation that is to be preferentially executed may also be defined by the user.

In this embodiment, user operation information is acquired, and an application program icon operated by a user and an application program corresponding to the application program icon may be determined, and a preset control operation that is to be preferentially executed of the application program is selected as a target control operation, thereby implementing the target control operation on the application program. In this embodiment, the target control operation on the application program may be implemented according to information about one user operation of the user, and the target control operation is the preset control operation that is to be preferentially executed, which satisfies an operation habit of the user, and a control process is simple and efficient, and accurately implements processing on the application program by the user.

Figure 4A:
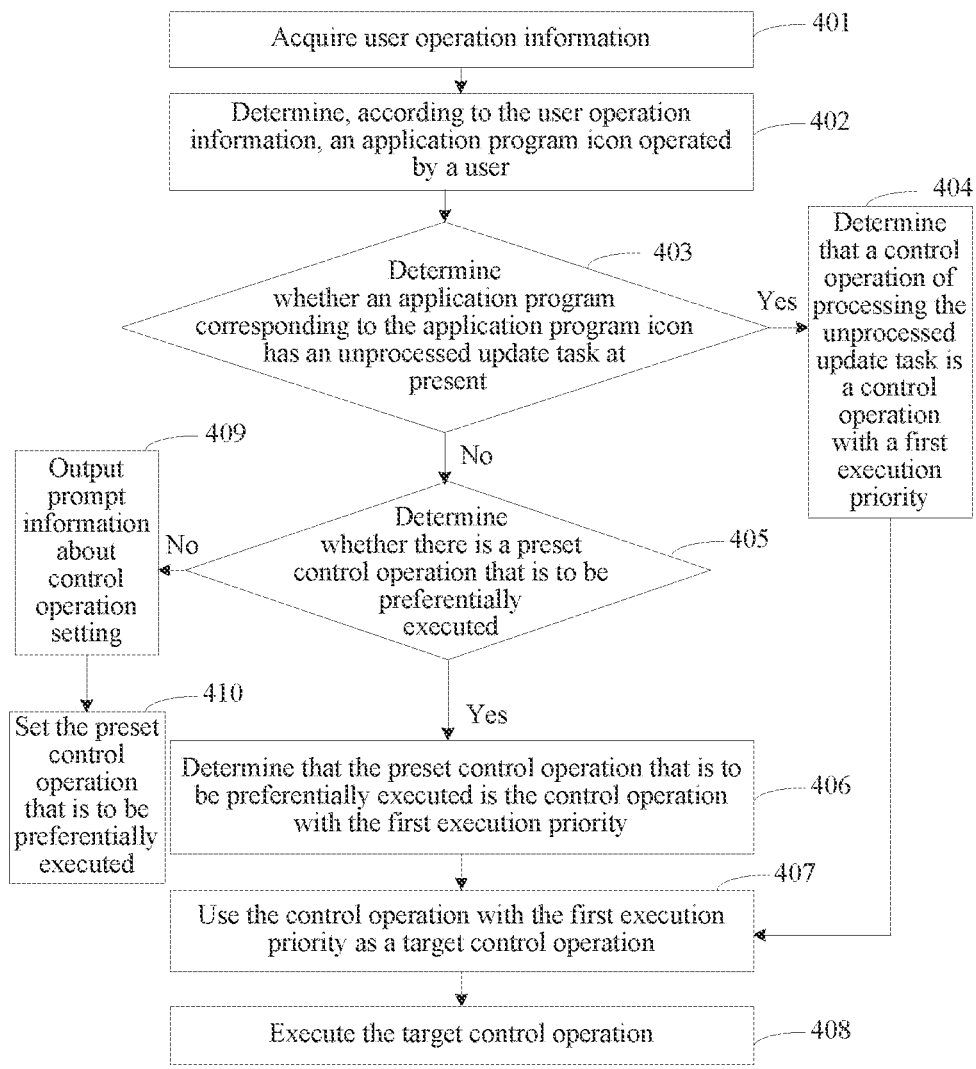
FIG. 4A is a flowchart of still another embodiment of an application program control method according to an embodiment of the present application.

FIG. 4A is a flowchart of another embodiment of an application program control method according to an embodiment of the present application, and the method may include the following steps.

Step 401: Acquire user operation information.

Step 402: Determine, according to the user operation information, an application program icon operated by a user.

As a possible implementation situation, it may further be determined whether the user operation information satisfies a preset condition, and when the preset condition is satisfied, an operation in step 402 or step 403 is further executed.

Step 403: Determine whether an application program corresponding to the application program icon has an unprocessed update task at present, if yes, execute step 404, and if no, execute step 405.

Step 404: Determine that a control operation of processing the unprocessed update task and is in a control operation of the application program is a control operation with a first execution priority.

Step 405: Determine whether a preset control operation that is to be preferentially executed exists in the control operation of the application program, if yes, execute step 406, and if no, execute step 409.

Step 406: Determine that the preset control operation that is to be preferentially executed is the control operation with the first execution priority.

Step 407: Use the control operation with the first execution priority as a target control operation.

Step 408: Execute the target control operation.

In this embodiment, when the application program has an unprocessed update task, the control operation of processing the unprocessed update task is used as the control operation with the first execution priority, when the application program does not have an unprocessed update task, if the application program has a preset control operation that is to be preferentially executed, the control operation that is to be preferentially executed is used as the control operation with the first execution priority.

Accordingly, when the target control operation is determined according to an execution priority of the control operation of the application program, it is determined that the control operation with the first execution priority is the target control operation.

The preset control operation that is to be preferentially executed may be a control operation that is to be executed first, that is selected front a historical record of the control operation of the application program, and whose quantity of recording times is greater than a threshold.

Certainly, the preset control operation that is to be preferentially executed may also be defined by the user. Therefore, as still another embodiment, when the preset control operation that is to be preferentially executed does not exist in the control operation of the application program, the method may further include the following steps.

Step 409: Output prompt information about control operation setting.

Step 410: Set, according to a processing request of the user, a control operation determined by the user as the preset control operation that is to be preferentially executed.

The prompt information about control operation setting may present, to the user, selection prompt information corresponding to each of multiple control operations, and the user may select, according to the prompt information, a control operation that the user wants to preferentially execute when operating the application program icon each time. Certainly, the user may also actively enter a key prompt word of a control operation that is to be preferentially executed. Accordingly, according to the processing request of the user, a system may determine the control operation and set the control operation as the preset control operation that is to be preferentially executed. When the user operation information is detected next time, or when it is detected that the user operation information satisfies a preset condition, it may be determined that the preset control operation that is to be preferentially executed and corresponding to the application program is the target control operation.

Figure 4B:
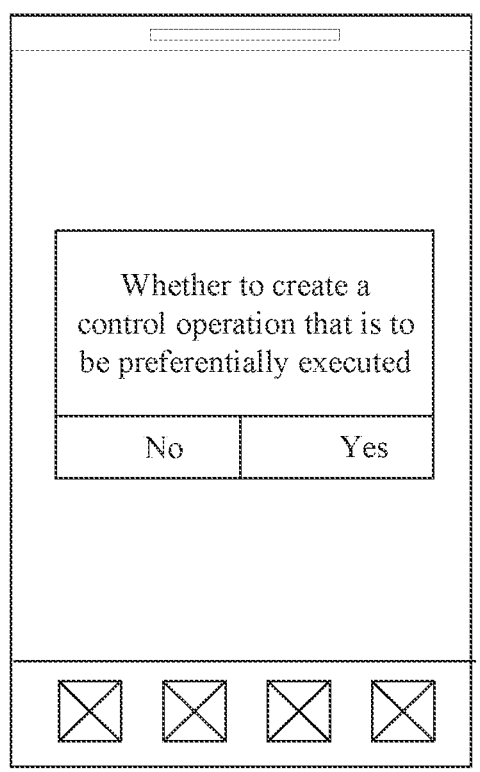
FIG. 4B is a schematic diagram of still another interface display of an electronic device applied in an embodiment of the present application.

Still using a mobile phone as an example, FIG. 4B shows still another schematic display diagram of a display interface of an electronic device according to an embodiment of the present application. It may be learned from FIG. 4B that the output prompt information about control operation setting is whether to define a control operation that is to be preferentially executed, and provides selection buttons "Yes" and "No" for the user. If the user clicks Yes, a control operation that is to be preferentially executed may be set.

In this embodiment, user operation information is acquired, and an application program icon operated by a user and an application program corresponding to the application program icon may be determined. When the application program has an unprocessed update task, a control operation of processing the unprocessed update task is used as a target control operation, and when the application program does not have an unprocessed update task, a preset control operation that is to be preferentially executed of the application program is used as the target control operation such that a control instruction may be generated and executed according to the determined target control operation. In addition, when the preset control operation that is to be preferentially executed does not exist in the application program, the user may further be prompted to set a control operation that is to be preferentially executed. This embodiment implements quick and efficient control on the application program. In addition, the control operation conforms to an operation habit of the user, and intelligent control is implemented on the application program.

As another possible implementation manner of this embodiment of the present application, it may also be first determined whether an application program has a preset control operation that is to be preferentially executed, and if no, it is further determined whether the application program has an unprocessed update task.

Figure 5:
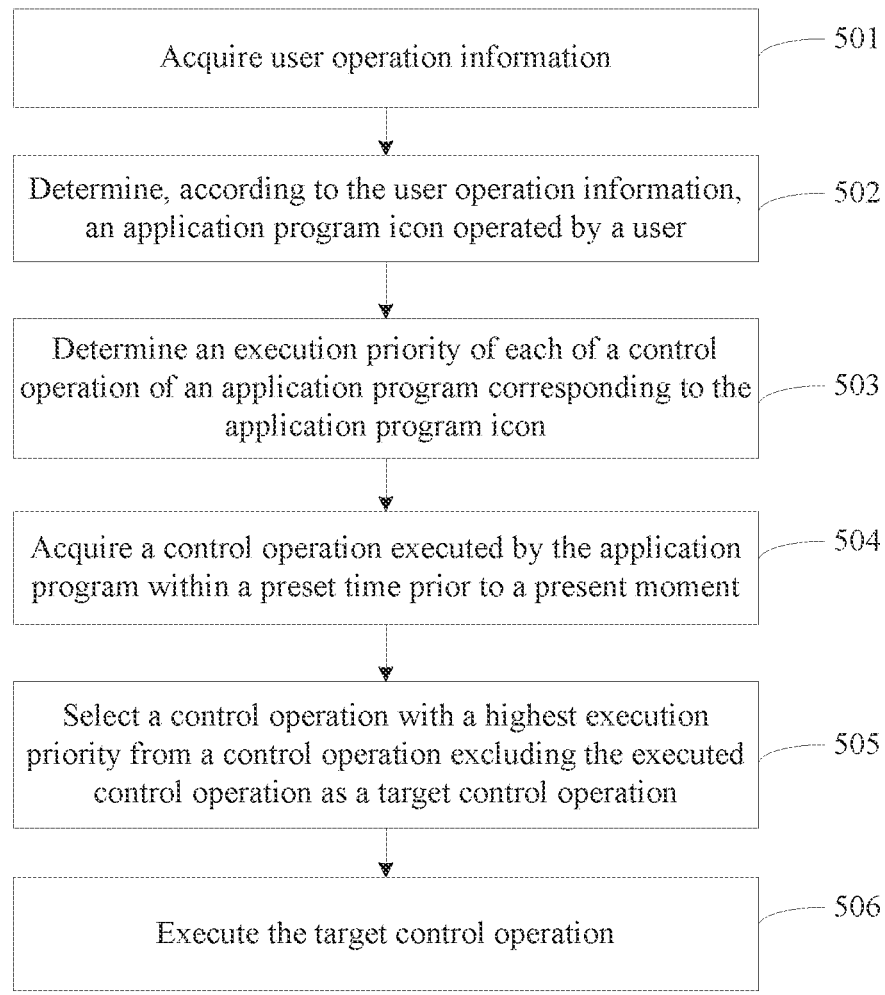
FIG. 5 is a flowchart of still another embodiment of an application program control method according to an embodiment of the present application.

FIG. 5 is a flowchart of another embodiment of an application program control method according to an embodiment of the present application, and the method may include the following steps.

Step 501: Acquire user operation information.

Step 502: Determine, according to the user operation information, an application program icon operated by a user.

As a possible implementation situation, it may further be determined whether the user operation information satisfies a preset condition, and when the preset condition is satisfied, an operation in step 502 or step 503 is further executed.

Step 503: Determine an execution priority of each of a control operation of an application program corresponding to the application program icon.

In this embodiment, each control operation of the application program has an execution priority, and the execution priority of each control operation may be preset.

Step 504: Acquire a control operation executed by the application program within a preset time prior to a present moment.

Step 505: Select a control operation with a highest execution priority from a control operation excluding the executed control operation as a target control operation.

In a practical application, because of a misoperation or another factor of a user, a control operation on an application program is not a control operation actually expected to be executed, or after executing a control operation on the application program, the user may expect to execute another control operation.

Therefore, in this embodiment, the control operation executed by the application program within the preset time prior to the present moment may be first acquired, where the present moment is a moment at which the user operation information is acquired.

If the control operation executed by the application program can be acquired, it indicates that when the user operates the application program icon last time, an implemented control operation is not a control operation expected to be executed, and the user may trigger the application program icon again in order to select the control operation with the highest execution priority from the control operation excluding the executed control operation as a current target control operation.

If the control operation executed by the application program cannot be acquired, a current operation may be considered as a first operation of the user. That is, the control operation with the highest execution priority is selected from the control operation of the application program as the target control operation.

Step 506: Execute the target control operation.

In this embodiment, user operation information is acquired, and an application program icon operated by a user and an application program corresponding to the application program icon may be determined, and a target control operation of the application program may be determined according to an execution priority of each of a control operation of the application program and a control operation executed by the application program within a preset time prior to a present moment. This embodiment implements quick and efficient control on the application program. In addition, the control operation conforms to an operation habit of the user, and intelligent control is implemented on the application program.

For ease of description, each of the foregoing method embodiments is described as a combination of a series of actions. However, a person skilled in the art should understand that the present application is not limited to the sequence of the described actions, because certain steps according to the present application may be executed in another sequence or concurrently. In addition, a person skilled in the art should also understand that the embodiments described herein are exemplary embodiments, and the involved actions and modules mentioned are not necessarily required by the present application.

Figure 6:
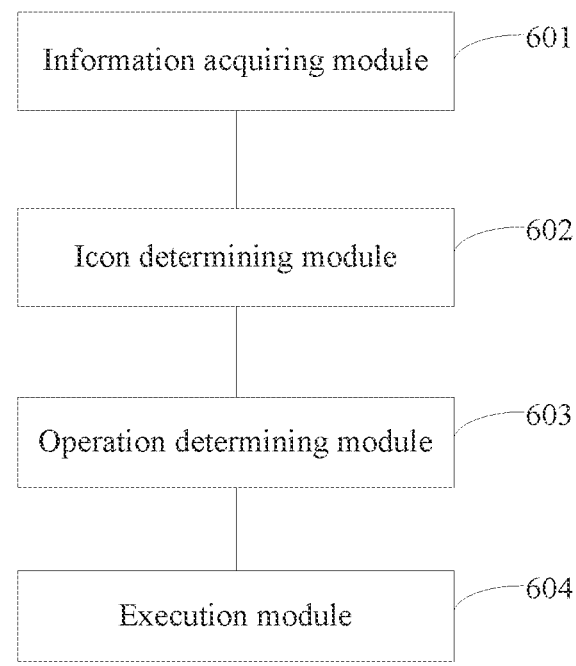
FIG. 6 is a schematic structural diagram of an embodiment of an application program control apparatus according to an embodiment of the present application.

FIG. 6 is a schematic structural diagram of an embodiment of an application program control apparatus according to an embodiment of the present application, and the apparatus may include an information acquiring module 601 configured to acquire user operation information, where the user operation information may refer to keyboard operation information, touchscreen operation information, and the like, an icon determining module 602 configured to determine, according to the user operation information acquired by the information acquiring module 601, an application program icon operated by a user, an operation determining module 603 configured to determine a target control operation according to a control operation of an application program corresponding to the application program icon that is determined by the icon determining module 602, and an execution module 604 configured to execute the target control operation determined by the operation determining module 603.

In this embodiment, when acquiring user operation information, the apparatus may determine an application program icon operated by a user, and may further determine a target control operation of an application program corresponding to the application program icon, and accordingly generates and executes a control instruction, thereby implementing the target control operation on the application program. The control operation is simple and efficient, compared with the prior art in which the user needs to first start the application program to open an application interface and then actively select and trigger a control operation on the application program. In addition, the user has no cognitive load, and when the user operates an application program icon, a target control operation of a corresponding application program may be automatically determined, thereby implementing efficient and quick control.

The target control operation may be a control operation that the user expects to execute on the application program corresponding to the application program icon, or a control operation that needs to be executed at present on the application program corresponding to the application program icon, or the like.

Determining the target control operation may be implemented in multiple manners. In a possible implementation manner, the operation determining module 603 may include a first determining module configured to determine an execution priority of the control operation of the application program corresponding to the application program icon that is determined by the icon determining module, and a second determining module configured to acquire the target control operation according to the execution priority that is determined by the first determining module and of the control operation of the application program corresponding to the application program icon, where the target control operation is a control operation with a first execution priority in the control operation.

Figure 7:
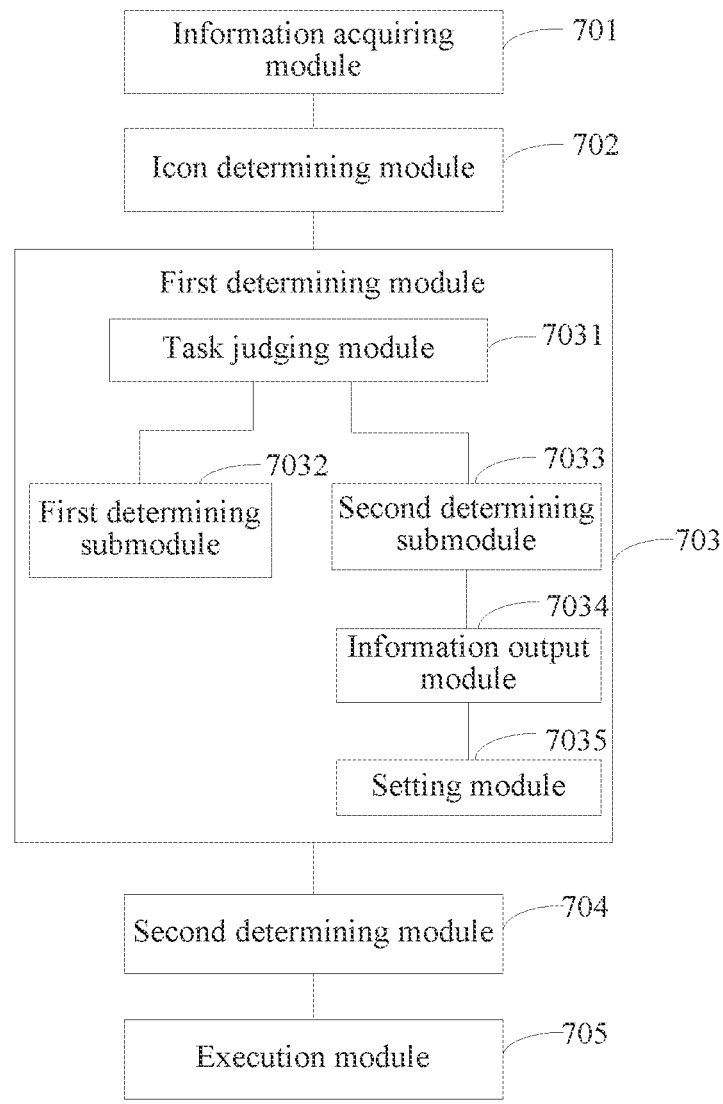
FIG. 7 is a schematic structural diagram of another embodiment of an application program control apparatus according to an embodiment of the present application.

FIG. 7 is a schematic structural diagram of another embodiment of an application program control apparatus according to an embodiment of the present application, and the apparatus may include an information acquiring module 701, an icon determining module 702, a first determining module 703, a second determining module 704, and an execution module 705.

The information acquiring module 701 is configured to acquire user operation information.

The icon determining module 702 is configured to determine, according to the user operation information acquired by the information acquiring module 701, an application program icon operated by a user.

The first determining module 703 is configured to determine an execution priority of a control operation of an application program corresponding to the application program icon that is determined by the icon determining module.

In this embodiment, an operation determining module that determines a target control operation according to the control operation of the application program corresponding to the application program icon that is determined by the icon determining module may include the first determining module 703 and the second determining module 704.

As a possible implementation manner, the first determining module 703 may include a task judging module 7031 configured to determine whether the application program corresponding to the application program icon that is determined by the icon determining module has an unprocessed update task at present, and a first determining submodule 7032 configured to, when the task judging module 7031 determines that the application program has an unprocessed update task, determine that a control operation, in the control operation of the application program, of processing the unprocessed update task is a control operation with a first execution priority.

As another possible implementation manner, when the task judging module 7031 determines that the application program does not have an unprocessed update task, the first determining module 703 may further include a second determining submodule 7033 configured to, when the task judging module 7031 determines that the application program does not have an unprocessed update task, determine that a preset control operation that is to be preferentially executed and is in the control operation of the application program is the control operation with the first execution priority.

The preset control operation that is to be preferentially executed may be a control operation that is to be executed first, that is selected from a historical record of the control operation of the application program, and whose quantity of recording times is greater than a threshold.

Certainly, the preset control operation that is to be preferentially executed may also be defined by the user.

The second determining module 704 is configured to acquire the target control operation according to the execution priority that is determined by the first determining module and of the control operation of the application program corresponding to the application program icon, where the target control operation is the control operation with the first execution priority in the control operation.

The execution module 705 is configured to execute the target control operation.

In this embodiment, when the application program has an unprocessed update task, the control operation of processing the unprocessed update task is used as the control operation with the first execution priority, and when the application program does not have an unprocessed update task, if the application program has a preset control operation that is to be preferentially executed, the control operation that is to be preferentially executed is used as the control operation with the first execution priority.

Accordingly when the target control operation is determined according to an execution priority of the control operation of the application program, it is determined that the control operation with the first execution priority is the target control operation.

The preset control operation that is to be preferentially executed may also be defined by the user.

Therefore, as still another possible implementation manner, the first determining module 703 may further include an information output module 7034 configured to output prompt information about control operation setting when the preset control operation that is to be preferentially executed does not exist in the control operation of the application program, and a setting module 7035 configured to process, according to a processing request of the user, a control operation determined by the user as the preset control operation that is to be preferentially executed.

In this embodiment, the apparatus acquires user operation information, and may determine an application program icon operated by a user and an application program corresponding to the application program icon. When the application program has an unprocessed update task, a control operation of processing the unprocessed update task is used as a target control operation, and when the application program does not have an unprocessed update task, a preset control operation that is to be preferentially executed of the application program is used as the target control operation such that a control instruction may be generated and executed according to the determined target control operation. In addition, when the preset control operation that is to be preferentially executed does not exist in the application program, the user may further be prompted to set a control operation that is to be preferentially executed. This embodiment implements quick and efficient control on the application program. In addition, the control operation conforms to an operation habit of the user, and intelligent control is implemented on the application program.

Figure 8:
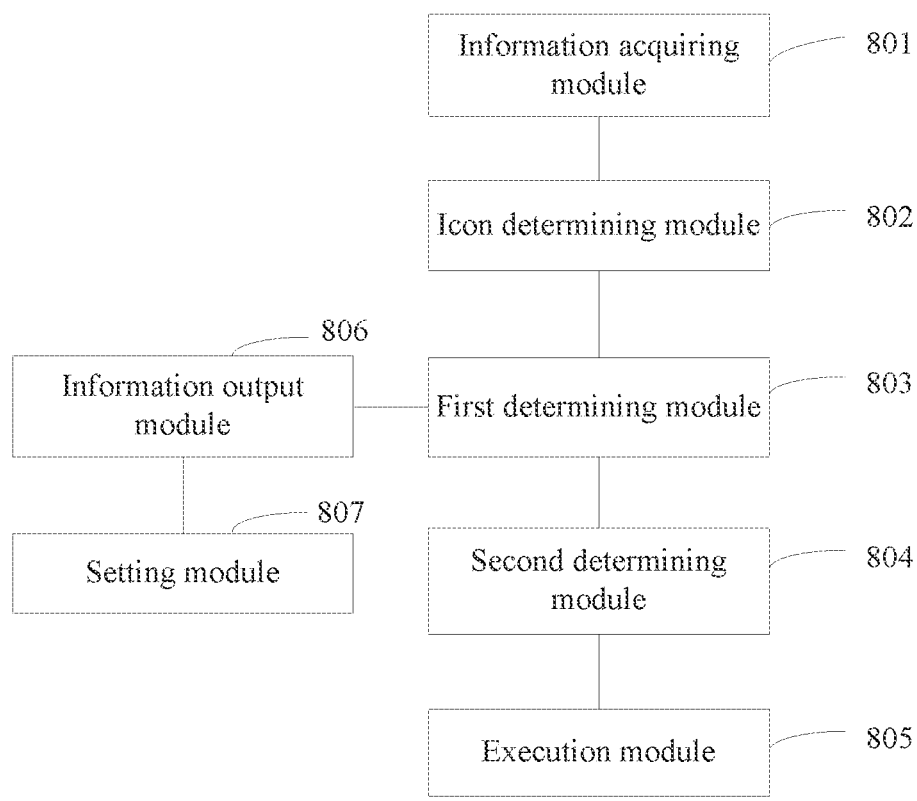
FIG. 8 is a schematic structural diagram of still another embodiment of an application program control apparatus according to an embodiment of the present application.

FIG. 8 is a schematic structural diagram of another embodiment of an application program control apparatus according to an embodiment of the present application, and the apparatus may include an information acquiring module 801, an icon determining module 802, a first determining module 803, a second determining module 804, and an execution module 805.

The information acquiring module 801 is configured to acquire user operation information.

The icon determining module 802 is configured to determine, according to the user operation information acquired by the information acquiring module 801, an application program icon operated by a user.

The first determining module 803 is configured to determine an execution priority of a control operation of an application program corresponding to the application program icon that is determined by the icon determining module.

In this embodiment, an operation determining module that determines a target control operation according to the control operation of the application program corresponding to the application program icon that is determined by the icon determining module may include the first determining module 803 and the second determining module 804.

As a possible implementation manner, the first determining module 803 is further configured to determine that a preset control operation that is to be preferentially executed and is in the control operation of the application program corresponding to the application program icon that is determined by the icon determining module is a control operation with a first execution priority.

The second determining module 804 is configured to acquire the target control operation according to the execution priority that is determined by the first determining module and of the control operation of the application program corresponding to the application program icon, where the target control operation is the control operation with the first execution priority in the control operation.

The execution module 805 is configured to execute the target control operation determined by the second determining module 804.

The preset control operation that is to be preferentially executed may be a control operation that is to be executed first, that is selected from a historical record of the control operation of the application program, and whose quantity of recording times is greater than a threshold.

Certainly, the preset control operation that is to be preferentially executed may also be defined by the user.

Therefore, the control operation that is to be preferentially executed may not exist in the application program. Therefore, as still another embodiment, the apparatus may further include an information output module 806 configured to output prompt information about control operation setting when the preset control operation that is to be preferentially executed does not exist in the control operation of the application program, and a setting module 807 configured to process, according to a processing request of the user, a control operation determined by the user as the preset control operation that is to be preferentially executed.

In this embodiment, user operation information is acquired, and an application program icon operated by a user and an application program corresponding to the application program icon may be determined, and a preset control operation that is to be preferentially executed of the application program is selected as a target control operation, thereby implementing the target control operation on the application program. In this embodiment, the target control operation on the application program may be implemented according to information about one user operation of the user, and the target control operation is the preset control operation that is to be preferentially executed, which satisfies an operation habit of the user, and a control process is simple and efficient, and accurately implements processing on the application program by the user.

Figure 9:
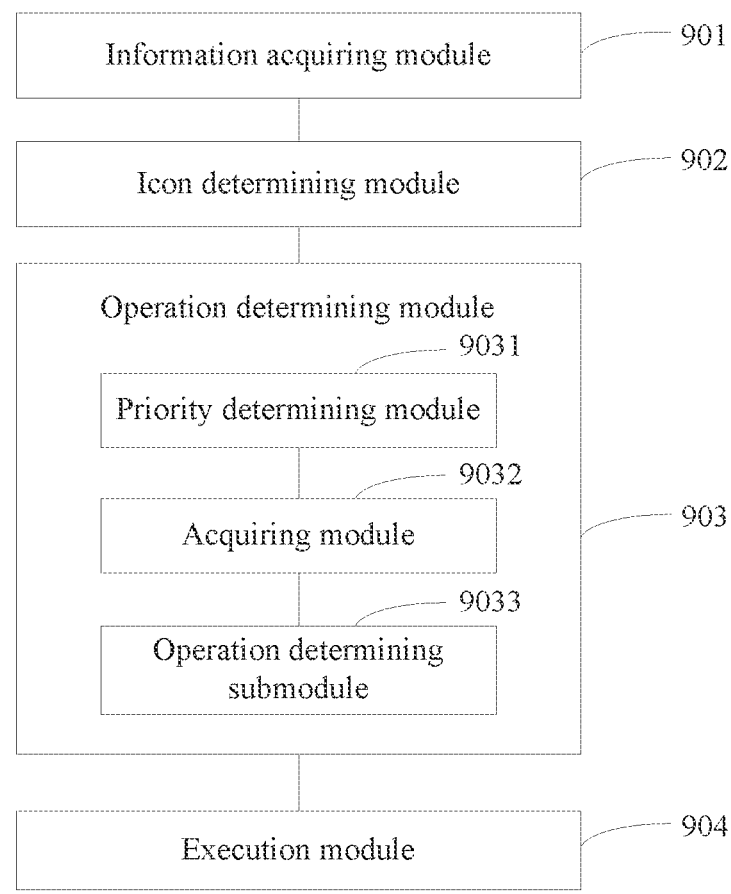
FIG. 9 is a schematic structural diagram of still another embodiment of an application program control apparatus according to an embodiment of the present application.

FIG. 9 is a schematic structural diagram of still another embodiment of an application program control apparatus according to an embodiment of the present application, and the apparatus may include an information acquiring module 901, an icon determining module 902, an operation determining module 903, and an execution module 904.

The information acquiring module 901 is configured to acquire user operation information.

The icon determining module 902 is configured to determine, according to the user operation information acquired by the information acquiring module 901, an application program icon operated by a user.

The operation determining module 903 is configured to determine a target control operation according to a control operation of an application program corresponding to the application program icon that is determined by the icon determining module 902.

As a possible implementation manner, in this embodiment, the operation determining module 903 may include a priority determining module 9031 configured to determine an execution priority of each of the control operation of the application program corresponding to the application program icon, where in this embodiment, each control operation of the application program has an execution priority, and the execution priority of each control operation may be preset, an acquiring module 9032 configured to acquire a control operation executed by the application program within a preset time prior to a present moment, and an operation determining submodule 9033 configured to select a control operation with a highest execution priority from a control operation excluding the executed control operation as the target control operation.

The execution module 904 is configured to execute the target control operation determined by the operation determining module.

In this embodiment, the acquiring module 9032 acquires the control operation executed by the application program within the preset time prior to the present moment, where the present moment is a moment at which the user operation information is acquired.

If the control operation executed by the application program can be acquired, it indicates that when the user operates the application program icon last time, an implemented control operation is not a control operation expected to be executed, and the user may trigger the application program icon again such that the operation determining submodule 9033 may select the control operation with the highest execution priority from the control operation excluding the executed control operation as a current target control operation.

If the control operation executed by the application program cannot be acquired, it may be considered as a first operation of the user, that is, the operation determining module 903 may also select the control operation with the highest execution priority from the control operation of the application program as the target control operation.

In this embodiment, the apparatus acquires user operation information, may determine an application program icon operated by a user and an application program corresponding to the application program icon, and may determine a target control operation of the application program according to an execution priority of a control operation of the application program and whether a first control operation is implemented on the application program within a preset time prior to a present moment in order to generate and execute a control instruction. This embodiment implements quick and efficient control on the application program. In addition, the control operation conforms to an operation habit of the user, and intelligent control is implemented on the application program.

In a practical application, the application program control apparatus in the foregoing embodiment may be integrated into an electronic device, where the electronic device may be a mobile device such as a mobile phone and a tablet computer. The electronic device in which the application program control apparatus of the embodiment of the present application is deployed may implement quick and efficient control on an application program and reduce complicated operation steps, thereby reducing a quantity of times of operating the electronic device by the user, and further reducing computation of the electronic device, which is conducive to improving performance of the electronic device.

Figure 10:
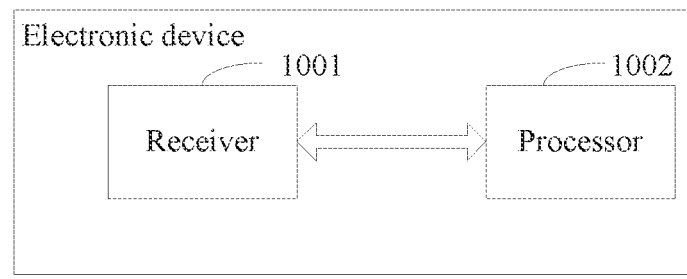
FIG. 10 is a schematic structural diagram of an embodiment of an electronic device according to an embodiment of the present application.

It may be learned from the foregoing description that, a person skilled in the art may clearly understand that the present application may be implemented using software in addition to a necessary universal hardware platform. Therefore, referring to FIG. 10, an embodiment of the present application further provides an electronic device, where the electronic device includes at least a receiver 1001 and a processor 1002, and the receiver and the processor are connected using a bus.

The receiver 1001 is configured to acquire user operation information, and the processor 1002 is configured to determine, according to the user operation information acquired by the receiver 1001, an application program icon operated by a user, determine a target control operation according to a control operation of an application program corresponding to the application program icon, and execute the target control operation.

As a possible implementation manner, that the processor 1002 determines the target control operation according to the control operation of the application program corresponding to the application program icon further includes determining an execution priority of the control operation of the application program corresponding to the application program icon, and acquiring the target control operation according to the execution priority of the control operation of the application program corresponding to the application program icon, where the target control operation is a control operation with a first execution priority in the control operation.

That the processor 1002 determines the execution priority of the control operation of the application program corresponding to the application program icon may be implemented in multiple manners, and reference may be made to specific manners that are shown in FIG. 2A to FIG. 4A and provided in embodiments of the present application.

As another possible implementation manner, that the processor 1002 determines the target control operation according to the control operation of the application program corresponding to the application program icon further includes determining an execution priority of each of the control operation of the application program corresponding to the application program icon, acquiring a control operation operated by the application program within a preset time prior to a present moment, and selecting a control operation with a highest execution priority from a control operation excluding the executed control operation as the target control operation.

The processor may be a central processing unit (CPU), or an application specific integrated circuit (ASIC), or one or more integrated circuits configured to implement the embodiment of the present disclosure.

The electronic device provided in this embodiment may be configured to execute any one of application program control methods that are shown in FIG. 1, FIG. 2A, FIG. 3, FIG. 4, FIG. 5, and FIG. 6 and provided in the embodiments of the present application.

The embodiments of the present specification are described in a progressive manner. The focus of each embodiment is placed on a difference from other embodiments. The same or similar parts of the embodiments can be referenced mutually. The apparatus disclosed in the embodiments is described relatively simply because it corresponds to the method disclosed in the embodiments, and for portions related to those of the method, reference may be made to the description of the method.

Finally, it should be noted that in this specification, relational terms such as first and second are used only to differentiate an entity or operation from another entity or operation, and do not necessarily require or imply that any actual relationship or sequence exists between these entities or operations. Moreover, the terms "include", "comprise", and any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, method, object, or device which includes the element.

For ease of description, the foregoing apparatus is described by dividing the functions into various units. Surely, when the present application is implemented, the functions of each unit may be implemented in one or more pieces of software and/or hardware.

It may be learned from description of the foregoing implementation manners that, a person skilled in the art may clearly understand that the present application may be implemented using software in addition to a necessary universal hardware platform. Based on such an understanding, the technical solutions of the present application essentially or the part contributing to the prior art may be implemented in a form of a software product. The software product may be stored in a storage medium, such as a read-only memory (ROM)/random-access memory (RAM), a magnetic disk, or an optical disc, and includes several instructions for instructing a computer device (which may be a personal computer, a server, or a network device) to perform the methods described in the embodiments or in some parts of the embodiments of the present application.

The embodiments disclosed above are described to enable a person skilled in the art to implement or use the present application. Various modifications made to the embodiments will be obvious to a person skilled in the art, and the general principles defined herein may also be implemented in other embodiments without departing from the spirit or scope of the present application. Therefore, the present application is not intended to be limited to these embodiments illustrated herein, but shall be construed in the widest scope consistent with the principles and novel features disclosed herein.

The invention claimed is:

1. A mobile device, comprising:
a memory configured to store instructions; and
a processor coupled to the memory and configured to execute the instructions to cause the mobile device to:
display a first user interface comprising a plurality of application program icons, wherein the first user interface is a home screen, wherein the application program icons comprise a first application program icon, and wherein the first application program icon corresponds to a short message service (SMS) application program;
receive an operation input on the first application program icon from a user;
display, in response to the operation input satisfying a first preset condition and an identifier being displayed at a boundary position of the first application program icon, a first processing interface comprising content of an unprocessed update task, wherein the first preset condition is a type of a preset touch operation, and wherein the identifier indicates that the SMS application program has the unprocessed update task;
display, in response to the operation input satisfying the first preset condition and no identifier being displayed at the boundary position, a second processing interface for creating an SMS message; and
display, in response to the operation input satisfying a second preset condition, a second user interface,
wherein the second preset condition is a click operation, and
wherein the second user interface is an application interface of the SMS application program when the SMS application program is launched.

2. The mobile device of claim 1, wherein the unprocessed update task indicates an unread SMS message, and wherein the first processing interface comprises at least a part of content of the unread SMS message.

3. The mobile device of claim 2, wherein the first processing interface further comprises a contact associated with the unread SMS message and a time when the unread SMS message is received.

4. The mobile device of claim 1, wherein a first display area of the first processing interface covers at least a part of a second display area of the first user interface.

5. The mobile device of claim 1, wherein a first display area of the second processing interface covers at least a part of a second display area of the first user interface.

6. The mobile device of claim 1, wherein the first processing interface is displayed below the first application program icon.

7. The mobile device of claim 1, wherein the first processing interface covers at least one of the application program icons other than the first application program icon.

8. The mobile device of claim 1, wherein the identifier is a quantity of unprocessed update tasks.

9. An application program control method implemented by a mobile device, wherein the application program control method comprises:
   displaying a first user interface comprising a plurality of application program icons, wherein the first user interface is a home screen, wherein the application program icons comprise a first application program icon, and wherein the first application program icon corresponds to a short message service (SMS) application program;
   receiving an operation input on the first application program icon from a user;
   displaying, in response to the operation input satisfying a first preset condition and an identifier being displayed at a boundary position of the first application program icon, a first processing interface comprising content of an unprocessed update task, wherein the first preset condition is a type of a preset touch operation, and wherein the identifier indicates that the SMS application program has the unprocessed update task;
   displaying, in response to the operation input satisfying the first preset condition and no identifier being displayed at the boundary position, a second processing interface for creating an SMS message; and
   displaying, in response to the operation input satisfying a second preset condition, a second user interface,
   wherein the second preset condition is a click operation, and
   wherein the second user interface is an application interface of the SMS application program when the SMS application program is launched.

10. The application program control method of claim 9, wherein the unprocessed update task indicates an unread SMS message, and wherein the first processing interface comprises at least a part of content of the unread SMS message.

11. The application program control method of claim 10, wherein the first processing interface further comprises a contact associated with the unread SMS message and a time when the unread SMS message is received.

12. The application program control method of claim 9, wherein a first display area of the first processing interface covers at least a part of a second display area of the first user interface.

13. The application program control method of claim 9, wherein a first display area of the second processing interface covers at least a part of a second display area of the first user interface.

14. The application program control method of claim 9, wherein the first processing interface is displayed below the first application program icon.

15. The application program control method of claim 9, wherein the first processing interface covers at least one of the application program icons other than the first application program icon.

16. The application program control method of claim 9, wherein the identifier is a quantity of unprocessed update tasks.

* * * * *